US012745206B2

(12) United States Patent
Kuo et al.

(10) Patent No.: US 12,745,206 B2
(45) Date of Patent: Sep. 22, 2026

(54) DUTY-CYCLE BASED POSITIONING SOUNDING REFERENCE SIGNALS

(71) Applicant: Nokia Technologies Oy, Espoo (FI)

(72) Inventors: Ping-Heng Kuo, Cambridge (GB); Taylan Sahin, Munich (DE); Oana-Elena Barbu, Aalborg (DK); Diomidis Michalopoulos, Munich (DE)

(73) Assignee: Nokia Technologies Oy, Espoo (FI)

( * ) Notice: Subject to any disclaimer, the term of this patent is extended or adjusted under 35 U.S.C. 154(b) by 365 days.

(21) Appl. No.: 18/563,494

(22) PCT Filed: Jun. 15, 2021

(86) PCT No.: PCT/EP2021/066058
§ 371 (c)(1),
(2) Date: Nov. 22, 2023

(87) PCT Pub. No.: WO2022/262947
PCT Pub. Date: Dec. 22, 2022

(65) Prior Publication Data

US 2024/0244571 A1 Jul. 18, 2024

(51) Int. Cl.
*H04W 64/00* (2009.01)
*H04L 1/1607* (2023.01)
*H04L 5/00* (2006.01)

(52) U.S. Cl.
CPC ........... *H04W 64/00* (2013.01); *H04L 1/1614* (2013.01); *H04L 5/0051* (2013.01)

(58) Field of Classification Search
CPC ..... H04W 64/00; H04L 1/1614; H04L 5/0051
See application file for complete search history.

(56) References Cited

U.S. PATENT DOCUMENTS

2013/0083683 A1 4/2013 Hwang et al.
2016/0080106 A1 3/2016 Srinivasan et al.
(Continued)

FOREIGN PATENT DOCUMENTS

EP 3016301 A1 5/2016
WO 2021/026699 A1 2/2021

OTHER PUBLICATIONS

"Motivation of study on radio enhancement based on AI", 3GPP TSG RAN Meeting #91-e, RP-210256, Oppo, Mar. 22-26, 2021, pp. 1-14.

(Continued)

*Primary Examiner* — Erika A Washington
(74) *Attorney, Agent, or Firm* — Lippes Mathias LLP

(57) ABSTRACT

Systems, methods, apparatuses, and computer program products for duty-cycle based positioning sounding reference signals. A method may include receiving, at a user equipment, configuration information of at least one periodic positioning sounding reference signal. The configuration information may include at least one time interval and at least one transmission resource associated with the at least one time interval. The method may also include transmitting the at least one periodic positioning sounding reference signal to a network entity based on the configuration information. The at least one periodic positioning sounding reference signal may be in a first transmission status or a second transmission status in accordance to the at least one time interval. The at least one time interval may occur periodically.

17 Claims, 10 Drawing Sheets

(56) References Cited

U.S. PATENT DOCUMENTS

| | | | |
|---|---|---|---|
| 2016/0119915 A1 | 4/2016 | Simonsson et al. | |
| 2018/0139763 A1 | 5/2018 | Bitra et al. | |
| 2019/0166452 A1 | 5/2019 | Tenny | |
| 2019/0353746 A1 | 11/2019 | Razavi et al. | |
| 2020/0225309 A1 | 7/2020 | Manolakos et al. | |
| 2021/0050978 A1 | 2/2021 | Manolakos et al. | |
| 2023/0156622 A1 * | 5/2023 | Cha | H04L 5/0091 370/318 |

OTHER PUBLICATIONS

"Initial Views on Release 18 NR", 3GPP TSG RAN Meeting #91-e, RP-210293, Samsung, Mar. 16-26, 2021, pp. 1-16.
"Study on AI/ML based air interface enhancement in Rel-18", 3GPP TSG RAN Meeting #91e, RP-210321, Agenda: 9.13, Vivo, Mar. 16-26, 2021, 12 pages.
"Study on evaluation methodology of AI enabled physical layer enhancement", 3GPP TSG RAN Meeting #91-e, RP-210393, Agenda: 9.13, CMCC, Mar. 16-26, 2021, 4 pages.
"Discussion on RAN Evolution for Distributed Intelligence", 3GPP TSG-RAN WG Meeting #91-e, RP-210447, Agenda: 15, Lenovo, Mar. 16-26, 2021, 3 pages.
"Support of Artificial Intelligence Applications for 5G Advanced", 3GPP TSG RAN Meeting #91e, RP-210614, Agenda: 9.13, ZTE, Mar. 16-21, 2021, pp. 1-15.
"Enhancements on predictable mobility for beam management", 3GPP TSG RAN WG Meeting #91-e, RP-210620, Agenda: 9.13, ZTE, Mar. 22-26, 2021, 7 pages.
"On the Scope of Rel-18 PHY Layer Enhancements using AI-based Solutions", 3GPP TSG RAN Meeting #91e, RP-210672, Agenda: 9.13, InterDigital Communications, Mar. 18-24, 2021, pp. 1-5.
"Initial views on Rel-18 technical areas, use cases and motivations", 3GPP TSG RAN Meeting #91-e, RP-210719, Agenda: 9.13, CATT, Mar. 16-26, 2021, 5 pages.
"Revised WID on NR Positioning Enhancements", 3GPP TSG RAN Meeting #91e, RP-210903, Agenda: 9.7.25, Intel Corporation, Mar. 16-26, 2022, 6 pages.
"3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305, V16.4.0, Mar. 2021, pp. 1-119.
"FL Summary for Potential Positioning Enhancements", 3GPP TSG RAN WG1 Meeting #103-e, R1-2009314, Agenda: 8.5.3, CATT, Oct. 26-Nov. 13, 2020, 60 pages.
International Search Report and Written Opinion received for corresponding Patent Cooperation Treaty Application No. PCT/EP2021/066058, dated Mar. 10, 2022, 12 pages.
"Discussion on UL Reference Signals for NR Positioning", 3GPP TSG RAN WG1 #99, R1-1911848, Agenda: 7.2.10.2, OPPO, Nov. 18-22, 2019, 5 pages.
"Discussion on UL Reference Signals for NR Positioning", 3GPP TSG RAN WG1 #98, R1-1908357, Agenda: 7.2.10.2, OPPO, Aug. 26-30, 2019, 6 pages.

* cited by examiner

Figure 10:
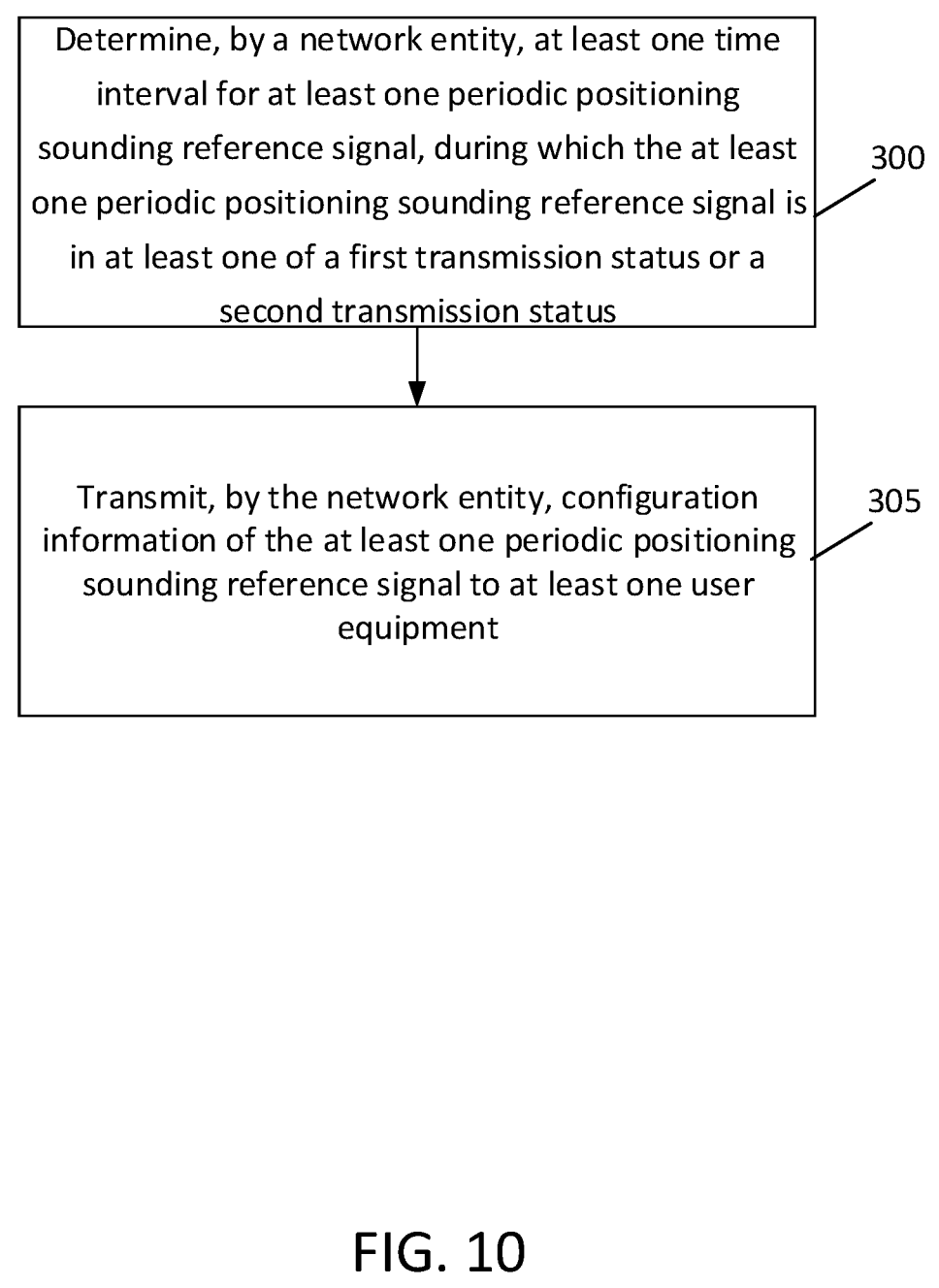

Determine, by a network entity, at least one time interval for at least one periodic positioning sounding reference signal, during which the at least one periodic positioning sounding reference signal is in at least one of a first transmission status or a second transmission status

300

Transmit, by the network entity, configuration information of the at least one periodic positioning sounding reference signal to at least one user equipment

DUTY-CYCLE BASED POSITIONING SOUNDING REFERENCE SIGNALS

RELATED APPLICATION

This application was originally filed as PCT Application No. PCT/EP2021/066058, filed on Jun. 15, 2021, which is incorporated herein by reference in its entirety.

FIELD

Some example embodiments may generally relate to mobile or wireless telecommunication systems, such as Long Term Evolution, LTE, or fifth generation, 5G, radio access technology or new radio, NR, access technology, or other communications systems. For example, certain embodiments may relate to apparatuses, systems, and/or methods for duty-cycle based positioning sounding reference signals.

BACKGROUND

Examples of mobile or wireless telecommunication systems may include the Universal Mobile Telecommunications System (UMTS) Terrestrial Radio Access Network, UTRAN, Long Term Evolution, LTE, Evolved UTRAN, E-UTRAN, LTE-Advanced, LTE-A, MulteFire, LTE-A Pro, and/or fifth generation, 5G, radio access technology or new radio (NR) access technology. 5G wireless systems refer to the next generation, NG, of radio systems and network architecture. 5G is mostly built on a new radio, NR, but the 5G (or NG) network can also build on E-UTRAN radio. It is estimated that NR will provide bitrates on the order of 10-20 Gbit/s or higher, and will support at least enhanced mobile broadband, eMBB, and ultra-reliable low-latency-communication, URLLC, as well as massive machine type communication, mMTC. NR is expected to deliver extreme broadband and ultra-robust, low latency connectivity and massive networking to support the Internet of Things, IoT. With IoT and machine-to-machine, M2M, communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments are directed to a method. The method may include receiving, at a user equipment, configuration information of at least one periodic positioning sounding reference signal. According to certain example embodiments, the configuration information may include at least one time interval and at least one transmission resource associated with the at least one time interval. The method may also include transmitting the at least one periodic positioning sounding reference signal to a network entity based on the configuration information. According to certain example embodiments, the at least one periodic positioning sounding reference signal may be in a first transmission status or a second transmission status in accordance to the at least one time interval. According to other example embodiments, the at least one time interval may occur periodically.

Other example embodiments are directed to an apparatus that may include at least one processor and at least one memory including computer program code. The at least one memory and the computer program code may be configured, with the at least one processor to cause the apparatus at least to receive configuration information of at least one periodic positioning sounding reference signal. According to certain example embodiments, the configuration information may include at least one time interval and at least one transmission resource associated with the at least one time interval. The apparatus may also be caused to transmit the at least one periodic positioning sounding reference signal to a network entity based on the configuration information. According to certain example embodiments, the at least one periodic positioning sounding reference signal may be in a first transmission status or a second transmission status in accordance to the at least one time interval. According to other example embodiments, the at least one time interval may occur periodically.

Other example embodiments are directed to an apparatus. The apparatus may include means for receiving configuration information of at least one periodic positioning sounding reference signal. According to certain example embodiments, the configuration information may include at least one time interval and at least one transmission resource associated with the at least one time interval. The apparatus may also include means for transmitting the at least one periodic positioning sounding reference signal to a network entity based on the configuration information. According to certain example embodiments, the at least one periodic positioning sounding reference signal may be in a first transmission status or a second transmission status in accordance to the at least one time interval. According to other example embodiments, the at least one time interval may occur periodically.

In accordance with other example embodiments, a non-transitory computer readable medium may be encoded with instructions that may, when executed in hardware, perform a method. The method may include receiving, at a user equipment, configuration information of at least one periodic positioning sounding reference signal. According to certain example embodiments, the configuration information may include at least one time interval and at least one transmission resource associated with the at least one time interval. The method may also include transmitting the at least one periodic positioning sounding reference signal to a network entity based on the configuration information. According to certain example embodiments, the at least one periodic positioning sounding reference signal may be in a first transmission status or a second transmission status in accordance to the at least one time interval. According to other example embodiments, the at least one time interval may occur periodically.

Other example embodiments may be directed to a computer program product that performs a method. The method may include receiving, at a user equipment, configuration information of at least one periodic positioning sounding reference signal. According to certain example embodiments, the configuration information may include at least one time interval and at least one transmission resource associated with the at least one time interval. The method may also include transmitting the at least one periodic positioning sounding reference signal to a network entity based on the configuration information. According to certain example embodiments, the at least one periodic positioning sounding reference signal may be in a first transmission status or a second transmission status in accordance to the at least one time interval. According to other example embodiments, the at least one time interval may occur periodically.

Other example embodiments may be directed to an apparatus that may include circuitry configured to receive configuration information of at least one periodic positioning sounding reference signal. According to certain example embodiments, the configuration information may include at least one time interval and at least one transmission resource associated with the at least one time interval. The apparatus may also include circuitry configured to transmit the at least one periodic positioning sounding reference signal to a network entity based on the configuration information. According to certain example embodiments, the at least one periodic positioning sounding reference signal may be in a first transmission status or a second transmission status in accordance to the at least one time interval. According to other example embodiments, the at least one time interval may occur periodically.

Certain example embodiments may be directed to a method. The method may include determining, by a network entity, at least one time interval for at least one periodic positioning sounding reference signal, during which the at least one periodic positioning sounding reference signal is in at least one of a first transmission status or a second transmission status. The method may also include transmitting, by the network entity, configuration information of the at least one periodic positioning sounding reference signal to at least one user equipment. According to certain example embodiments, the configuration information may include the at least one time interval and at least one transmission resource associated with the at least one time interval. According to other example embodiments, the at least one time interval may occur periodically.

Other example embodiments may be directed to an apparatus. The apparatus may include at least one processor and at least one memory including computer program code. The at least one memory and computer program code may be configured to, with the at least one processor, cause the apparatus at least to determine at least one time interval for at least one periodic positioning sounding reference signal, during which the at least one periodic positioning sounding reference signal is in at least one of a first transmission status or a second transmission status. The apparatus may also be caused to transmit configuration information of the at least one periodic positioning sounding reference signal to at least one user equipment. According to certain example embodiments, the configuration information may include the at least one time interval and at least one transmission resource associated with the at least one time interval. According to other example embodiments, the at least one time interval may occur periodically.

Other example embodiments may be directed to an apparatus. The apparatus may include means for determining at least one time interval for at least one periodic positioning sounding reference signal, during which the at least one periodic positioning sounding reference signal is in at least one of a first transmission status or a second transmission status. The apparatus may also include means for transmitting configuration information of the at least one periodic positioning sounding reference signal to at least one user equipment. According to certain example embodiments, the configuration information may include the at least one time interval and at least one transmission resource associated with the at least one time interval. According to other example embodiments, the at least one time interval may occur periodically.

In accordance with other example embodiments, a non-transitory computer readable medium may be encoded with instructions that may, when executed in hardware, perform a method. The method may include determining, by a network entity, at least one time interval for at least one periodic positioning sounding reference signal, during which the at least one periodic positioning sounding reference signal is in at least one of a first transmission status or a second transmission status. The method may also include transmitting, by the network entity, configuration information of the at least one periodic positioning sounding reference signal to at least one user equipment. According to certain example embodiments, the configuration information may include the at least one time interval and at least one transmission resource associated with the at least one time interval. According to other example embodiments, the at least one time interval may occur periodically.

Other example embodiments may be directed to a computer program product that performs a method. The method may include determining, by a network entity, at least one time interval for at least one periodic positioning sounding reference signal, during which the at least one periodic positioning sounding reference signal is in at least one of a first transmission status or a second transmission status. The method may also include transmitting, by the network entity, configuration information of the at least one periodic positioning sounding reference signal to at least one user equipment. According to certain example embodiments, the configuration information may include the at least one time interval and at least one transmission resource associated with the at least one time interval. According to other example embodiments, the at least one time interval may occur periodically.

Other example embodiments may be directed to an apparatus that may include circuitry configured to determine at least one time interval for at least one periodic positioning sounding reference signal, during which the at least one periodic positioning sounding reference signal is in at least one of a first transmission status or a second transmission status. The apparatus may also include circuitry configured to transmit configuration information of the at least one periodic positioning sounding reference signal to at least one user equipment. According to certain example embodiments, the configuration information may include the at least one time interval and at least one transmission resource associated with the at least one time interval. According to other example embodiments, the at least one time interval may occur periodically.

BRIEF DESCRIPTION OF THE DRAWINGS

For proper understanding of example embodiments, reference should be made to the accompanying drawings, wherein:

FIG. 10 illustrates a flow diagram of another method, according to certain example embodiments.

FIG. 11(*b*) illustrates another apparatus, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for duty-cycle based positioning sounding reference signals.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments. Further, the phrase "based on" may indicate a condition and/or situation. For example, "based on" may mean "if", and "based on" may be interchangeable with the conditional word "if".

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Figure 1:
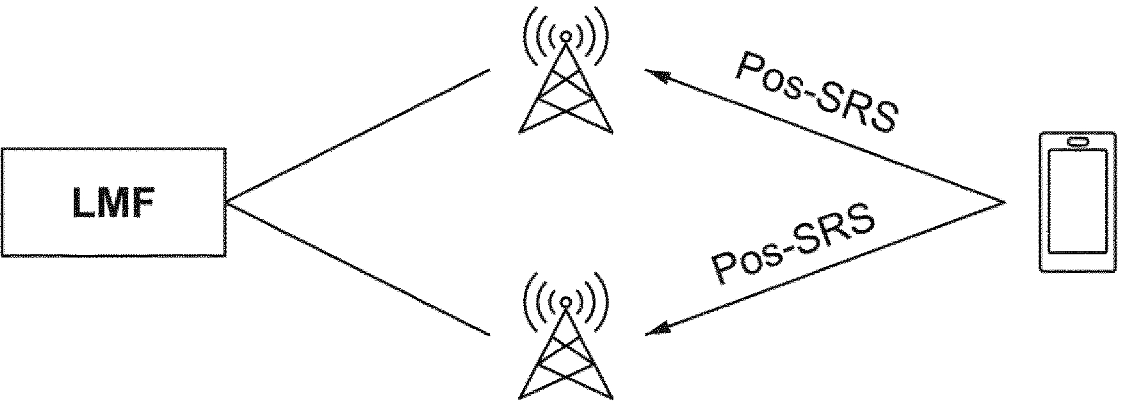
FIG. 1 illustrates an example uplink-based (UL-based) positioning scheme.

FIG. 1 illustrates an example uplink-based (UL-based) positioning scheme. The position of a device may be acquired based on 3$^{rd}$ Generation Partnership Project New Radio (3GPP NR) framework using either user equipment-based (UE-based) or UE-assisted positioning. For example, as illustrated in FIG. 1, for UE-assisted positioning, sounding reference signals (SRS) in UL may be transmitted by the UE and measured by multiple transmission reception points (TRPs). The measurements may then be provided to a location server such as a location management function (LMF) to derive the UE position.

In some cases, a request for a UE position may be periodic where the location service (LCS) client can update the UE position regularly. This may important for certain applications in the automotive industry or Industrial Internet of Things (IIoT) domains, where the application needs to continuously track the device location as the targeted device is potentially on move. Thus, periodic positioning SRS has been developed by 3GPP, wherein the UE can transmit SRS periodically (if configured) without the need of dynamic SRS activation commands from the gNB.

On the other hand, certain trends have been exhibited in 3GPP. For instance, 3GPP has identified certain solutions to achieve positioning with better accuracy and lower latency, which may be advantageous for verticals such as IIoT and automotive industries. This may imply that, when an UL-based positioning method is used, a dense SRS resource allocation may be applied when urgent and sufficient measurements are needed at the network side for UE position derivation. In contrast, low-power positioning for low-cost devices may be desired. One way to reduce power consumption may be to avoid unnecessary transmission from the UE.

It may be desired for NR-LITE to address new use cases with IoT-type of requirements (e.g., low-complexity, enhanced coverage, long battery life, and massive number of devices) that cannot be met by enhanced machine type communication (eMTC) and NB-IoT. Such requirements may include, for example, positioning accuracy of 30 cm-1 m to support, for example, indoor asset tracking, coordinated vehicle control, and remote monitoring. Another requirement may include battery life (2-4×) longer than enhanced mobile broadband (eMBB).

Certain example embodiments may involve UL positioning methods such as UL time difference of arrival (UL-TDoA) and UL angle of arrival (AoA). For such methods, the LMF may request a radio access network (RAN) to provide measurements periodically to derive UE position (e.g., for automotive applications). Whenever such a request is made, the LMF may need to obtain these measurements immediately due to latency constraints.

Moreover, in frequency range 2 (FR2) the UE may transmit multiple SRS in different beam directions to ensure they can be heard by multiple geographically separated TRPs, which may imply that multiple SRS may need to be transmitted by the UE within a short period of time. This can be enabled by configuring the UE with a periodic positioning SRS with very short periodicity, which may ensure a large number of SRS can be transmitted by the UE in a short period of time immediately after a request of UE position is made. However, it may also mean that the UE should transmit such dense positioning SRS even if there is no positioning request, which may result in unnecessary resource and power wastage, as well as creating interference to other users.

Figure 2:
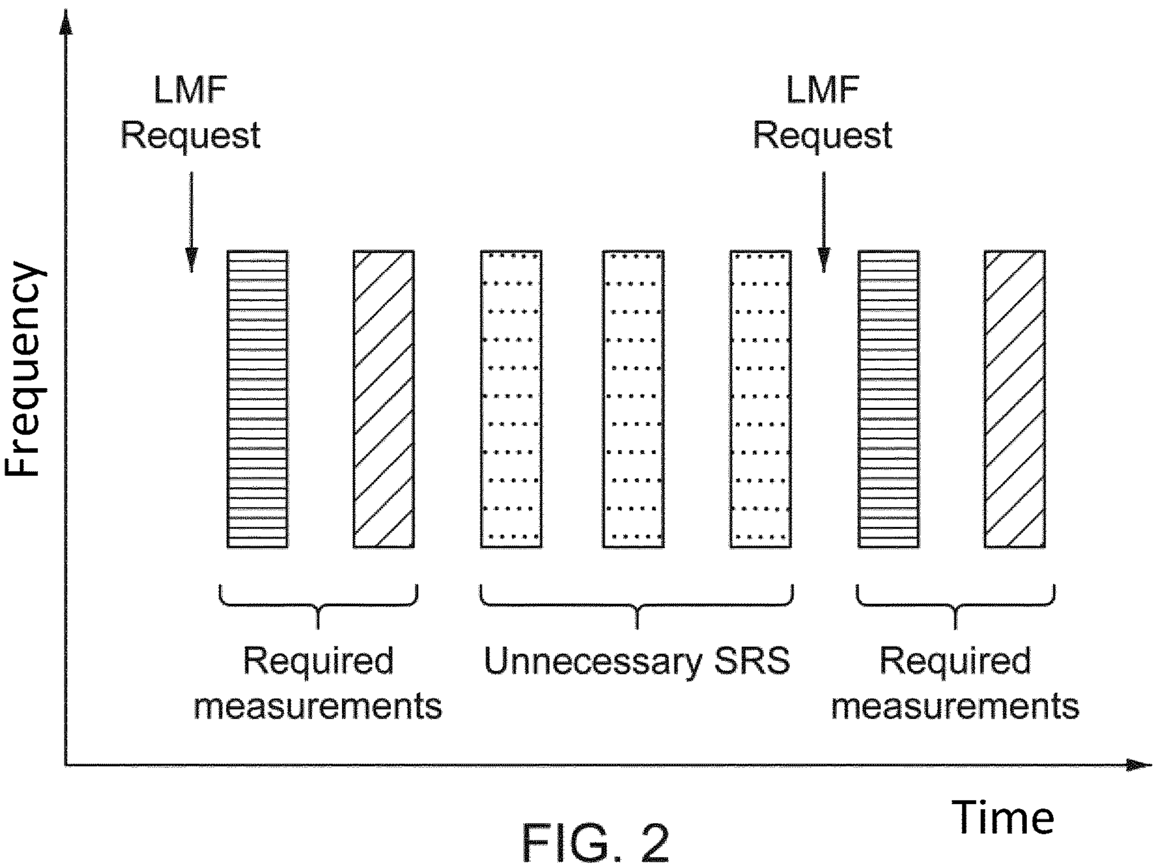
FIG. 2 illustrates an example of resource wastage due to short-periodicity positioning sounding reference signal (SRS).

FIG. 2 illustrates an example of resource wastage due to short-periodicity positioning SRS. As illustrated in the example of FIG. 2, each vertical bar may represent an SRS transmission or non-transmission. In particular, FIG. 2 illustrates a case where the UE performs some unnecessary SRS transmissions based on the configuration of the periodic SRS, even when the network nodes do not need these measurements. It may be possible that the gNB may dynamically activate/deactivate this periodic SRS depending on the request from the LMF, but the signaling overhead that may incur persistently contradicts with the goals of minimizing power/resource consumption. Thus, certain example embodiments may provide ways to ensure that the RAN can provide measurements for positioning to the LMF with low latency without wasting power and resources of the UE for positioning-SRS transmission, while also minimizing the signaling overhead.

Figure 3:
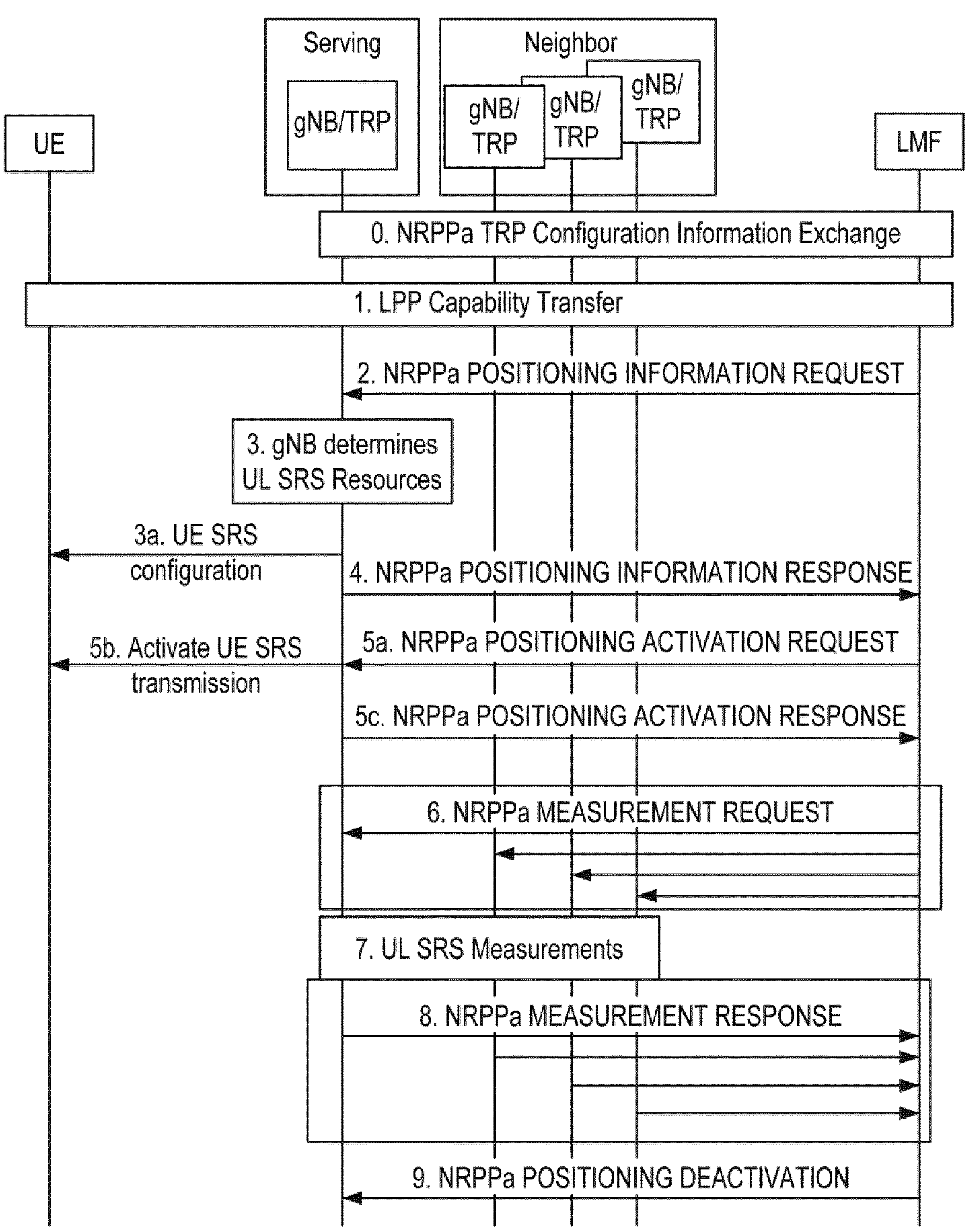
FIG. 3 illustrates an example of an uplink time difference of arrival (UL-TDoA)/uplink angle of arrival (UL-AoA) process.

FIG. 3 illustrates an example of an UL-TDoA/UL-AoA process. At 0, the LMF engages in a new radio positioning protocol annex (NRPPa) configuration information exchange with the serving gNB/TRP and neighboring gNBs/TRPs. At 1, an LTE positioning protocol (LPP) capability transfer occurs between the UE, serving gNBs/TRPs, neighboring gNBs/TRPs, and the LMF. At 2, the LMF may transmit a NRPPa positioning information request to the serving gNB/TRP. At 3, the serving gNB/TRP may determine UL SRS resources, and transmit the UE SRS configuration to the UE at 3a. At 4, the serving gNB/TRP may transmit an NRPPa positioning information response to the LMF. The LMF may then, at 5a, transmit an NRPPa positioning activation request to the serving gNB/TRP. At 5b, the serving gNB/TRP may activate a UE SRS transmission with the UE. At 5c, the serving gNB/TRP may transmit a NRPPa positioning activation response to the LMF.

As further illustrated in FIG. 3, at 6, the LMF may transmit a NRPPa measurement request to the serving gNB/TRP and each of the neighboring gNBs/TRPs. At 7, the serving gNB/TRP and the neighboring gNBs/TRPs may perform UL SRS measurements. At 8, the serving gNB/TRP and the neighboring gNBs/TRPs may transmit NRPPa measurement responses to the LMF. At 9, after receiving the responses from the serving gNB/TRP and the neighboring gNBs/TRPs, the LMF may transmit a NRPPa positioning deactivation to the serving gNB/TRP.

With reference to FIG. 3, 3GPP specifies that the UL-TDoA/UL AoA positioning involves information transfer from the LMF to the RAN (i.e., the serving gNB) regarding the UL timing information (i.e., measurement periodicity, timing advance type, expected SRS propagation delay, with uncertainty) as part of the NRPPa positioning information request message (see FIG. 3). However, there is no consideration in 3GPP on providing the expected timing request from the LCS client to the RAN by any core network entity.

Figure 4:
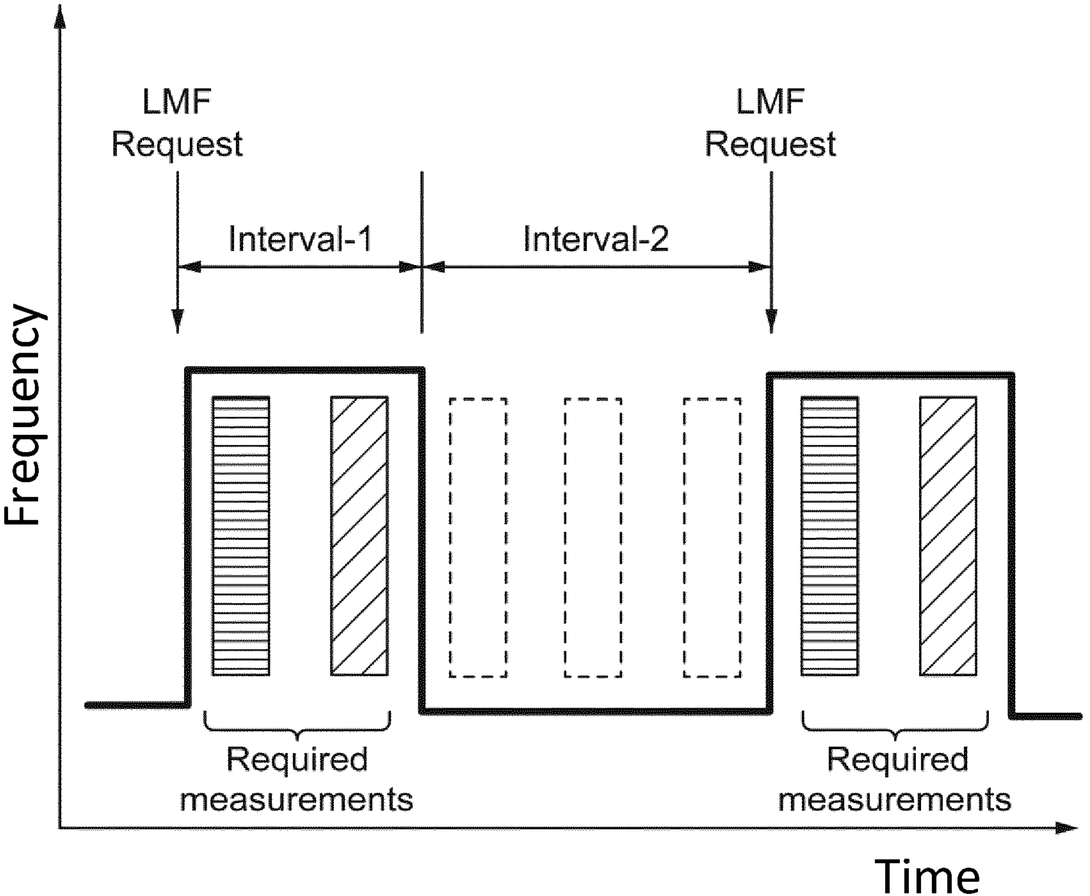
FIG. 4 illustrates an example duty-cycle-based configuration of periodic SRS transmissions, according to certain example embodiments.

FIG. 4 illustrates an example duty-cycle-based configuration of periodic SRS transmissions, according to some example embodiments. Certain example embodiments may provide a periodic positioning SRS configuration where the parameters and/or status of the periodic positioning SRS configuration may be changed in a cyclic manner according to a pre-configured duty-cycle. This may be performed to ensure appropriate parameters are used whenever a positioning request is made by the LMF, while avoiding wastage of energy and resource when measurements at the network side is actually not required.

In the example illustrated in FIG. 4, a periodic positioning SRS configuration may include a first interval (i.e., Interval-1) and a second interval (i.e., Interval-2) that are applied in a cyclic manner, in accordance to a duty-cycle that is specifically configured for this periodic SRS. During Interval-1, the periodic SRS may be in a first transmission status (e.g., activated based on the default SRS periodicity). According to certain example embodiments, by matching the starting point of each Interval-1 to the expected timing of periodic LMF request, the UE may begin to transmit the SRS immediately based on the default setting after the request is made, and measurements can be conducted rapidly. On the other hand, during Interval-2, the SRS may be switched to a second transmission status (e.g., muted autonomously and excessive wastage of resource due to short-periodicity SRS transmission may be avoided). In certain example embodiments, the first and second transmission status of the SRS may correspond to transmission of SRS using different parameter sets (e.g., a different Comb structure, a different periodicity, a different beam configuration/direction, or a different transmission power level).

In certain example embodiments, a configuration message from the gNB to the UE may indicate the parameters relating to the duty-cycle for at least one SRS configuration (e.g., timing and duration of Interval-1 and Interval-2, and/or SRS parameters to be applied during these intervals). In other example embodiments, a message from the gNB to at least one other gNB/TRP may indicate the parameters relating to the duty-cycle for at least one SRS configuration (e.g. timing and duration of Interval-1 and Interval-2, and/or SRS parameters to be applied during these intervals). In some example embodiments, the UE may adapt its behavior to adapt to SRS status/parameters in accordance to the gNB configurations in either Interval-1 or Interval-2.

According to some example embodiments, in order to properly set the duty-cycle for the positioning SRS, it may be assumed that the RAN has knowledge about the expected timing of positioning request from the LCS client. For instance, the RAN may derive such knowledge with a message from the LCS client to the LMF indicating the expected timing of position request (time of the first measurement, periodicity, etc.). Alternatively, in other example embodiments, the RAN may derive such knowledge with a message from the LMF to the RAN (gNB and/or UE) indicating the expected timing of position request (time of the first measurement, periodicity, etc.).

Figure 5:
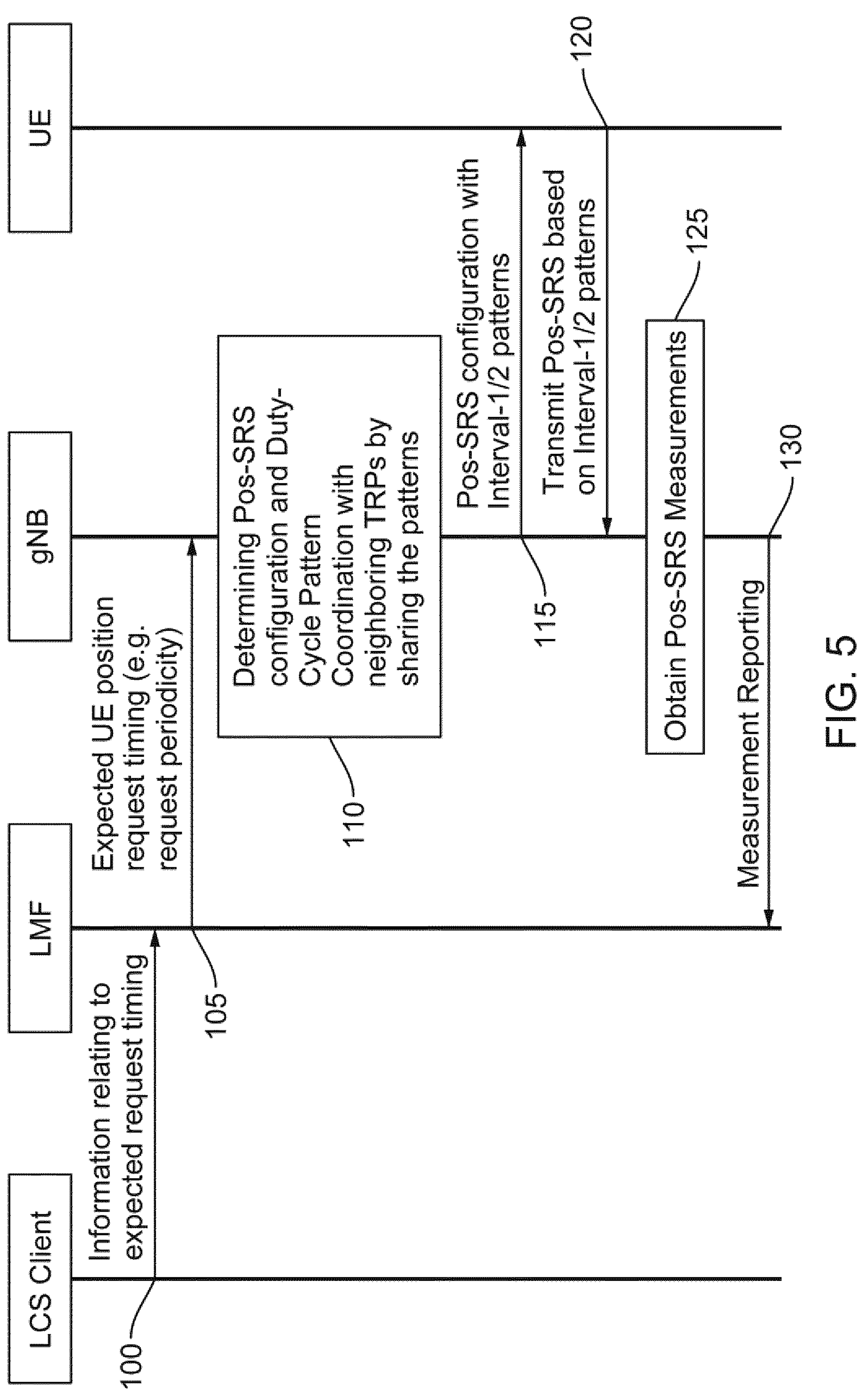
FIG. 5 illustrates an example signaling diagram, according to certain example embodiments.

FIG. 5 illustrates an example signaling diagram, according to certain example embodiments. At 100, the LCS client may provide information to the LMF relating to when and how often (periodically) a positioning request is expected. At 105, LMF may provide such information corresponding to the expected UE position request timing (e.g., request periodicity) to at least one RAN node, including, for example, either the gNB or/and the UE. In certain example embodiments, the LMF may provide this information to the serving gNB as part of the NRPPa positioning information request (i.e., operation 2 in FIG. 3). In other example embodiments, the information may be provided as part of a new message between the LMF and the RAN.

At 110, based on the received information, the gNB may determine an appropriate positioning SRS with a suitable periodicity and duty-cycle setting. The gNB may also coordinate with at least one other neighboring gNB/TRP to notify this determined setting. In certain example embodiments, there may be certain ways to fulfill the inter-gNB coordination. For instance, according to some example embodiments, the LMF may provide to the serving gNB, together with the configuration message indicating the duty-cycle parameters, a list of neighboring gNBs that intend to measure positioning SRS. The LMF may obtain this information via a NRPPa TRP/gNB configuration information exchange (i.e., operation 0 in FIG. 3). Then, the gNB may use the Xn interface to pass this information to the gNBs indicated by LMF. According to other example embodiments, the serving gNB may inform the LMF about the configured duty-cycle pattern of the SRS, which may then inform the neighboring gNBs.

At 115, the gNB may transmit the configuration based on the determined periodic positioning SRS (Pos-SRS) setting to the UE, which may include duty-cycle patterns and/or SRS status/parameters that should be applied in either Interval-1 or Interval-2. At 120, the UE may follow the configuration and apply appropriate setting(s) to the periodic Pos-SRS depending on whether it is in Interval-1 or Interval-2 to transmit the SRS. In addition, at 120, the UE may transmit the periodic Pos-SRS based on either Interval-1 or Interval-2 patterns to the gNB. At 125, the gNB may obtain the periodic Pos-SRS measurements, and, at 130, the gNB may report the obtained periodic Pos-SRS measurements to the LMF.

According to certain example embodiments, the SRS status/parameters may correspond to the periodic SRS being activated during Interval-1, and muted (i.e., SRS is not transmitted; SRS is deactivated) during Interval-2 (see FIG. 4). In this example embodiment, the time units within both intervals may be repeated with the same periodicity.

Figure 6:
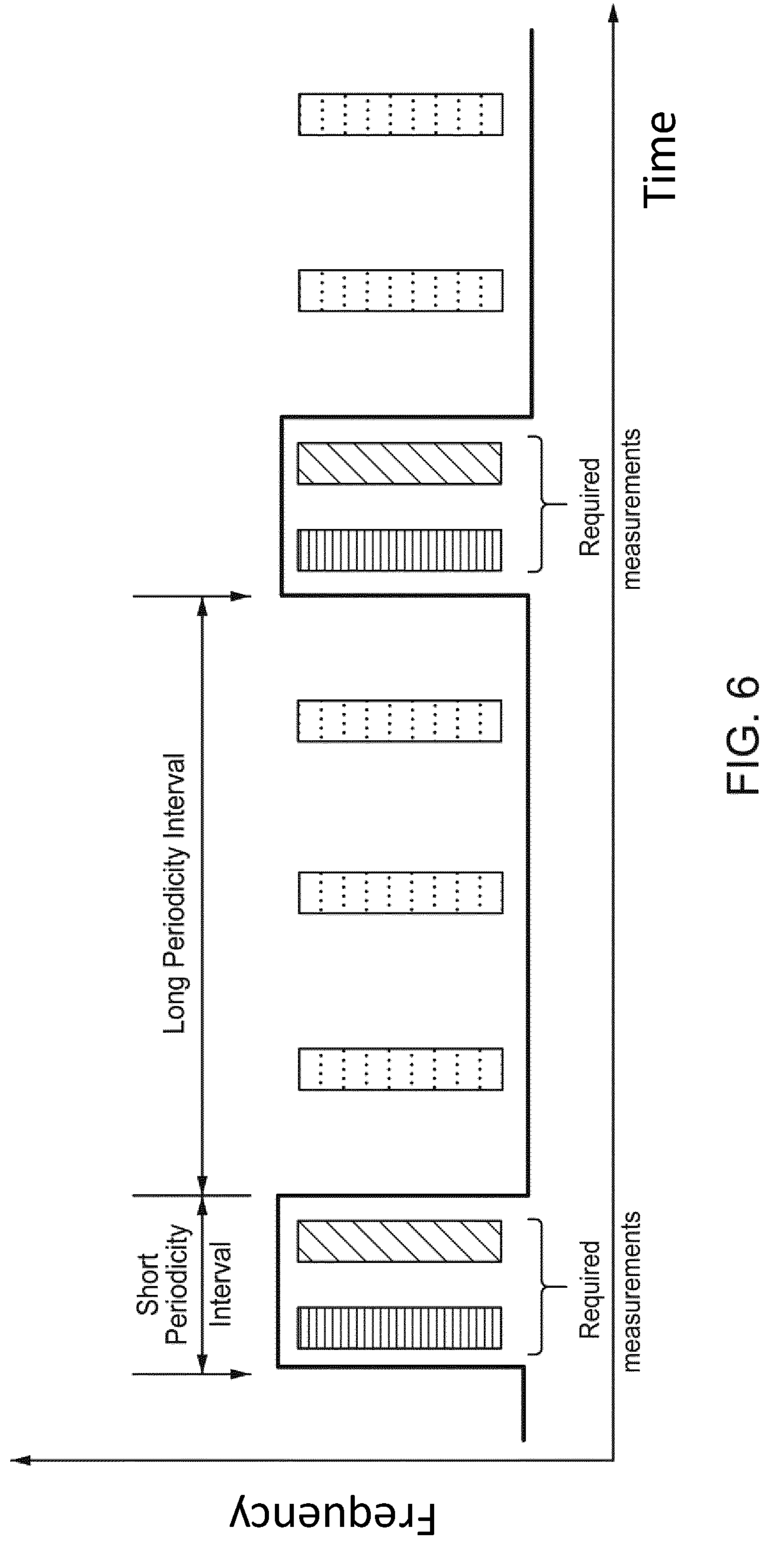
FIG. 6 illustrates an example duty-cycle based positioning sounding reference signal (Pos-SRS), according to certain example embodiments.

In other example embodiments, the SRS status/parameters may correspond to a first periodicity being used for the Pos-SRS during Interval-1, and a second periodicity being used for the Pos-SRS during Interval-2. For instance, FIG. 6 illustrates an example duty-cycle based Pos-SRS, according to certain example embodiments. In particular, as illustrated in the example of FIG. 6, there may be a short periodicity and a longer periodicity being applied in Interval 1 and Interval 2, respectively.

Figure 7:
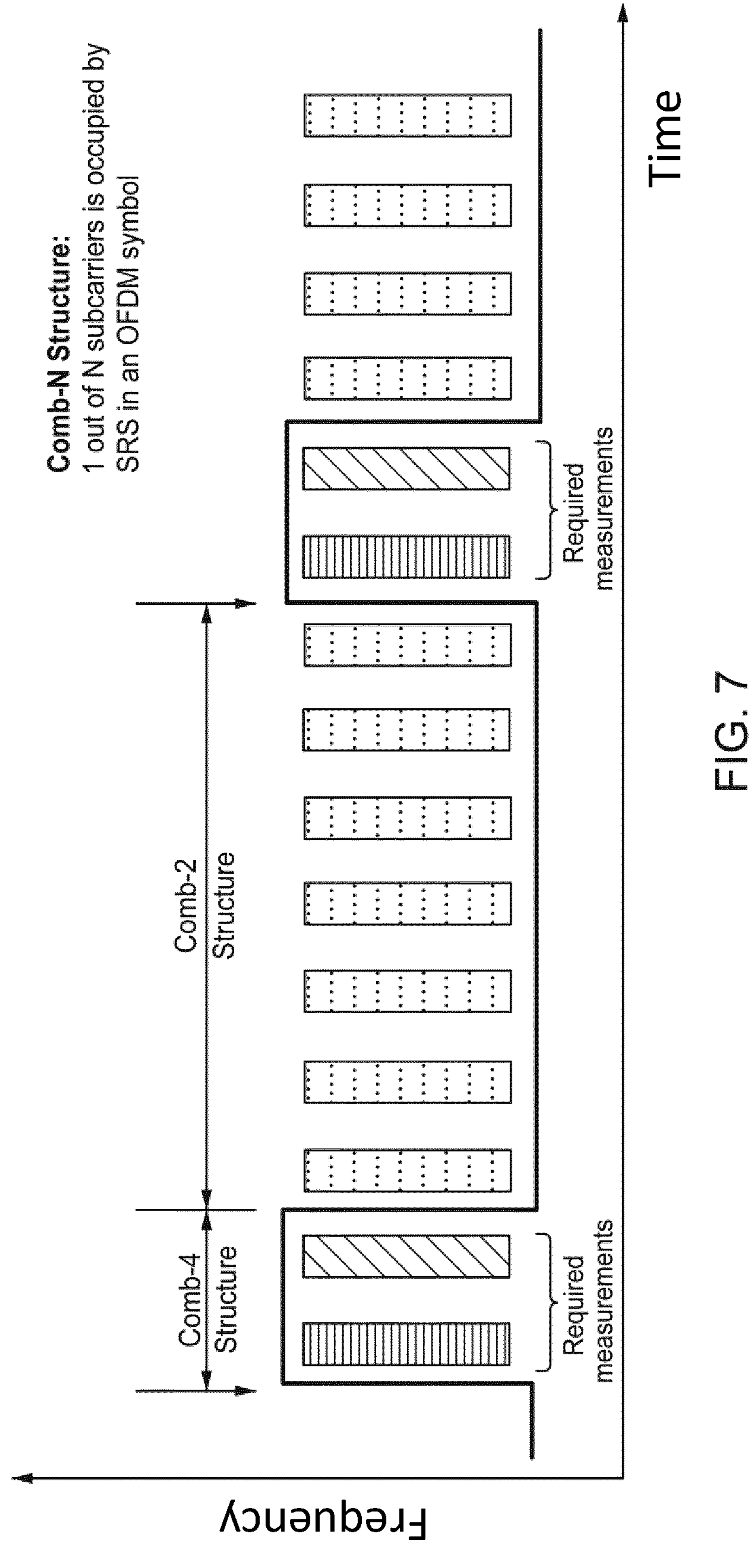
FIG. 7 illustrates an example duty-cycle based Pos-SRS, according to certain example embodiments.

According to further example embodiments, the SRS status/parameters may correspond to a first comb-N structure being used for Pos-SRS during Interval-1, and a second comb-N structure being used for the Pos-SRS during Interval-2. For instance, FIG. 7 illustrates an example duty-cycle based Pos-SRS, according to certain example embodiments. In particular, FIG. 7 illustrates an example duty-cycle based Pos-SRS where different comb-N structures are applied in ON and OFF intervals, according to certain example embodiments. Additionally, FIG. 7 illustrates a comb-4 structure and a comb-2 structure being applied in Interval-1 and Interval-2, respectively. In some example embodiments, the comb-N structure may represent how SRS symbol is inter-spaced in the frequency domain in each orthogonal frequency division multiplexing (OFDM) symbol.

According to further example embodiments, the SRS status/parameters may correspond to a first beam configuration/direction being used for Pos-SRS during Interval-1, and a second beam configuration/direction being used for the Pos-SRS during Interval-2.

Figure 8:
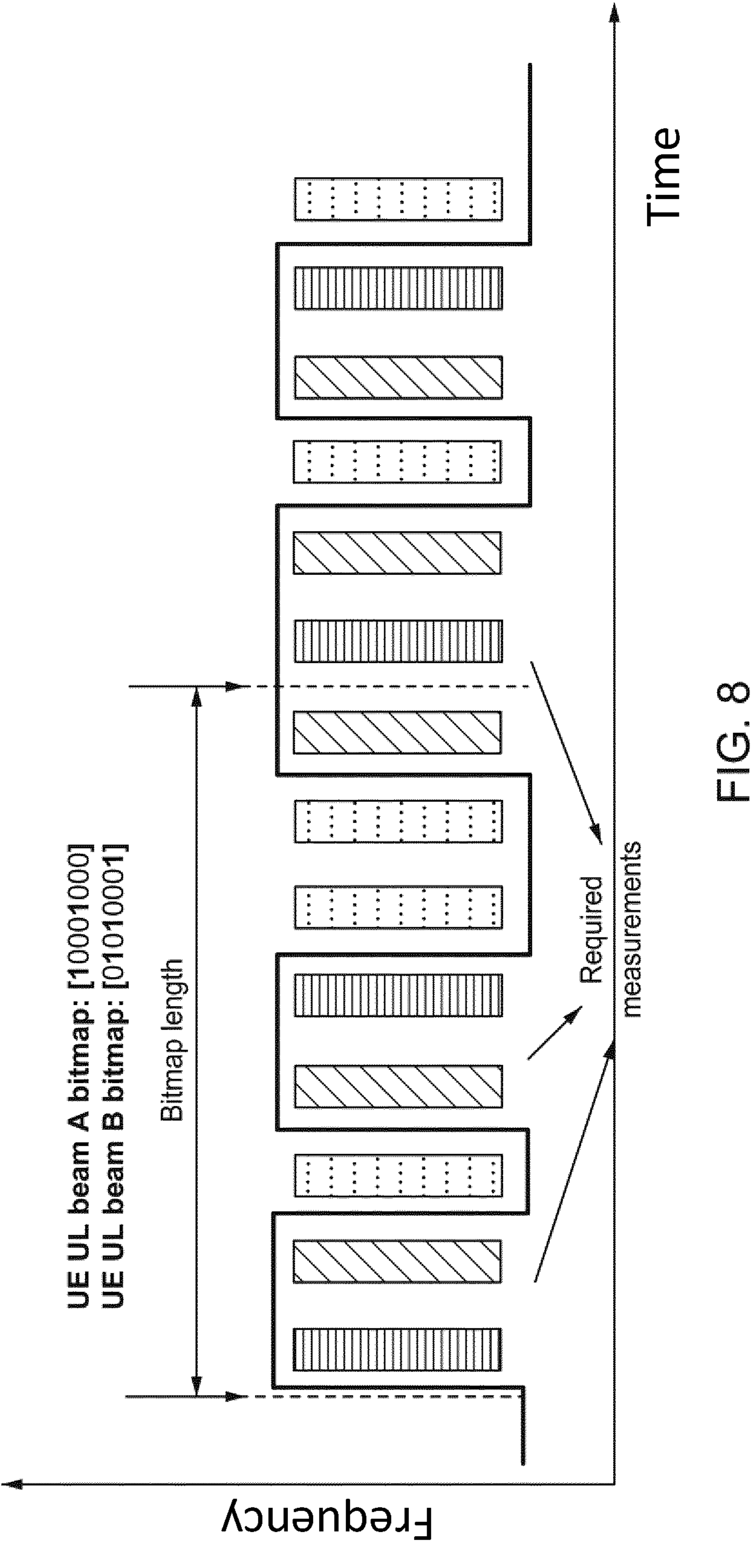
FIG. 8 illustrates another example duty-cycle based Pos-SRS, according to certain example embodiments.

FIG. 8 illustrates another example duty-cycle based Pos-SRS, according to certain example embodiments. In particular, FIG. 8 illustrates another example duty-cycle based Pos-SRS where bitmaps may determine the ON/OFF-intervals of SRS transmissions using different beams, according to certain example embodiments. According to certain example embodiments, the SRS status/parameters may also correspond to, instead of adjacent Interval-1 followed by adjacent Interval-2 within a cycle, a bitmap may be used to configure the SRS transmissions. In certain example embodiments, the bitmap may indicate the specific time units to transmit SRS within a cycle. In addition, the length of the bitmap may determine the length of the cycle of such transmissions. Further, different bitmaps may be configured for SRS transmissions using different (sets of) beams, for example, targeting different TRPs. In some example embodiments. The bitmap configuration may enable non-adjacent transmissions, which may increase the flexibility of scheduling other transmissions. As illustrated in the example of FIG. 8, there may be two bitmaps [10001000] and [01010001] configured for two UE beams, where "1"s indicate the ON-time units and "0"s indicate the OFF-time units within a cycle of length 8 time units.

According to other example embodiments, the SRS status/parameters may correspond to a multi-modal SRS transmission format that may be defined using the duty-cycle concept from the above-described example embodiments. Specifically, the UE may be configured with different modes. According to certain example embodiments, in a mode 1, the UE may be configured in a high accuracy positioning mode, similar to the interval where SRS is activated, where the UE needs to be fast and accurately localized. According to other example embodiments, in a mode 2, the UE may be configured with lower power consumption mode. In this case, the UE may be coarsely localized for other radio resource management (RRM) purposes, even though there is no explicit client request. However, the UE may be highly mobile and UE position prediction may be necessary for resource allocation, beam alignment, etc. As such, mode 2 may be similar to the interval where SRS is deactivated, as shown above, with the difference that the SRS transmission may be optimized for power consumption, for example, by lowering the transmission power.

In certain example embodiments, the UE may be configured with a mode 3 for low co-channel interference. Similar to mode 2, this mode may be defined to enable UE localization while creating minimal interference to other UEs in the network. In this case, the UE may be configured with a larger SRS bandwidth (i.e., low power spectral density). In other example embodiments, the UE may be configured with a mode 4 with interval corresponding to muted SRS, as defined in the above example embodiments. According to certain example embodiments, the modes (e.g., modes 1-4) may be predefined and associated with a fixed SRS time-frequency configuration. Such a configuration may enable the UE to be informed of the mode pattern only: mode 1+mode 3, mode 1+mode 2, etc.

Figure 9:
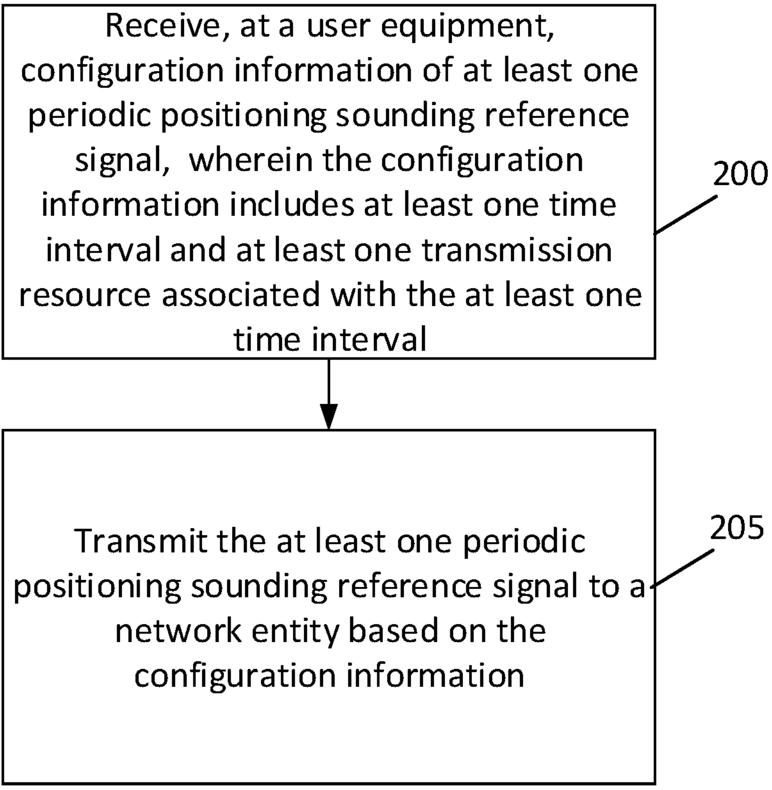
FIG. 9 illustrates a flow diagram of a method, according to certain example embodiments.

FIG. 9 illustrates a flow diagram of a method, according to certain example embodiments. In some example embodiments, the flow diagram of FIG. 9 may be performed by a telecommunications network entity or network node in a 3GPP system, such as LTE or 5G-NR. For instance, in certain example embodiments, the method of FIG. 9 may be performed by a UE, for instance similar to apparatuses 10 or 20 illustrated in FIG. 11(*a*) or 11(*b*).

According to certain example embodiments, the method of FIG. 9 may include, at 200, receiving, at a user equipment, configuration information of at least one periodic positioning sounding reference signal. According to certain example embodiments, the configuration information may include at least one time interval and at least one transmission resource associated with the at least one time interval. At 205, the method may include transmitting the at least one periodic positioning sounding reference signal to a network entity based on the configuration information. According to certain example embodiments, the at least one periodic positioning sounding reference signal may be in a first transmission status or a second transmission status in accordance to the at least one time interval. According to other example embodiments, the at least one time interval may occur periodically.

According to certain example embodiments, the first transmission status may correspond to a first set of parameters associated with the at least one periodic positioning sounding reference signal. According to some example embodiments, the second transmission status may correspond to a second set of parameters associated with the at least one periodic positioning sounding reference signal. According to other example embodiments, the first transmission status may correspond to transmitting the at least one periodic positioning sounding reference signal. According to further example embodiments, the second transmission status may correspond to muting the transmission of the at least one periodic sounding reference signal.

In certain example embodiments, a periodicity for transmitting the at least one periodic sounding reference signal in the first transmission status may be different from a periodicity for transmitting the at least one periodic sounding reference signal in the second transmission status. In some example embodiments, the first set of parameters may include a first comb structure of the at least one periodic positioning sounding reference signal. In other example embodiments, the second set of parameters may include a second comb structure different from the first comb structure of the at least one periodic positioning sounding reference signal.

According to certain embodiments, the at least one periodic positioning sounding reference signal may be associated to at least one bitmap. According to some example embodiments, the bitmap may indicate a specific time unit in the first transmission status or the second transmission status of the at least one periodic positioning sounding reference signal within a cycle. In certain example embodiments, the at least one periodic positioning sounding reference signal is associated to a plurality of bitmaps. In some example embodiments, each of the plurality of bitmaps may indicate a specific time unit in the first transmission status or the second transmission status of the at least one periodic positioning sounding reference signal within a cycle. In other example embodiments, each of the plurality of bitmaps may be mapped to a specific beam or beam set configuration. According to some example embodiments, the method may further include receiving configuration of a multi-modal sounding reference signal transmission format comprising a plurality of modes. According to further example embodiments, the plurality of modes comprises at least one of a high accuracy positioning mode, a low power consumption mode, a low interference mode, and an interval corresponding to muted sounding reference.

FIG. 10 illustrates a flow diagram of another method, according to certain example embodiments. In an example embodiment, the method of FIG. 10 may be performed by a telecommunications network entity or network node in a 3GPP system, such as LTE or 5G-NR. For instance, in certain example embodiments, the method of FIG. 10 may be performed by a gNB, for instance similar to apparatuses 10 or 20 illustrated in FIG. 11(*a*) or 11(*b*).

According to certain example embodiments, the method of FIG. 10 may include, at 300, determining, by a network entity, at least one time interval for at least one periodic positioning sounding reference signal, during which the at least one periodic positioning sounding reference signal is in at least one of a first transmission status or a second transmission status. At 305, the method may include transmitting, by the network entity, configuration information of the at least one periodic positioning sounding reference signal to at least one user equipment. According to certain example embodiments, the configuration information may include the at least one time interval and at least one transmission resource associated with the at least one time interval. According to other example embodiments, the at least one time interval may occur periodically.

According to certain example embodiments, the method may also include receiving the at least one periodic positioning sounding reference signal from the at least one user equipment based on the configuration information. According to some example embodiments, the determining may be based on at least one requirement of positioning of at least one device. According to other example embodiments, the first transmission status may correspond to a first set of parameters associated with the at least one periodic positioning sounding reference signal, and the second transmission status may correspond to a second set of parameters associated with the at least one periodic positioning sounding reference signal.

In certain example embodiments, the first transmission status may correspond to transmission of the at least one periodic positioning sounding reference signal, and the second transmission status may correspond to muting of the at least one periodic sounding reference signal. In some example embodiments, a periodicity for transmitting the at least one periodic sounding reference signal in the first transmission status may be different from a periodicity for transmitting the at least one periodic sounding reference signal in the second transmission status. In other example embodiments, the first set of parameters may include a first comb structure of the at least one periodic positioning sounding reference signal. In further example embodiments, the second set of parameters may include a second comb structure different from the first comb structure of the at least one periodic positioning sounding reference signal.

According to certain example embodiments, the method may further include configuring the at least one periodic positioning sounding reference signal with at least one bitmap. According to some example embodiments, the at least one bitmap may indicate a specific time unit in the first transmission status or the second transmission status of the at least one periodic positioning sounding reference signal within a cycle. In certain example embodiments, the method may also include configuring the at least one periodic positioning sounding reference signal with a plurality of bitmaps. In some example embodiments, each of the plurality of bitmaps may indicate a specific time unit in the first transmission status or the second transmission status of the at least one periodic positioning sounding reference signal within a cycle. In other example embodiments, each of the plurality of bitmaps may be mapped to a specific beam or beam set configuration. According to other example embodiments, the method may further include configuring the at least one user equipment with a multi-modal sounding reference signal transmission format comprising a plurality of modes. According to further example embodiments, the plurality of modes comprises at least one of a high accuracy positioning mode, a low power consumption mode, a low interference mode, and an interval corresponding to muted sounding reference.

Figure 11A:
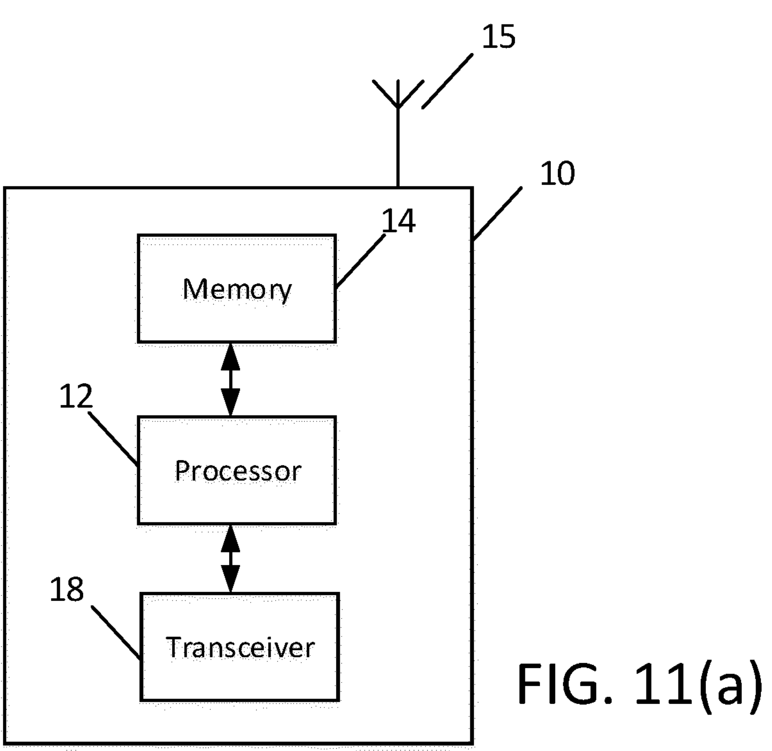
FIG. 11(*a*) illustrates an apparatus, according to certain example embodiments.
Figure 11B:
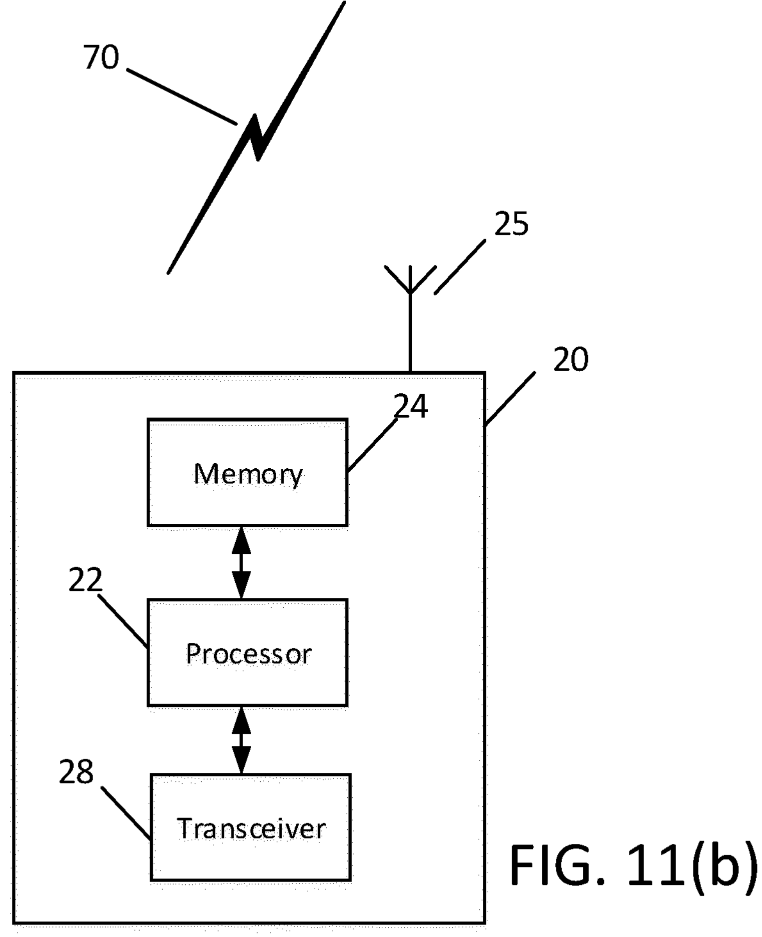

FIG. 11(*a*) illustrates an apparatus 10 according to certain example embodiments. In an embodiment, apparatus 10 may be a network element in a communications network or associated with such a network, such as a UE, or other similar device. It should be noted that one of ordinary skill in the art would understand that apparatus 10 may include components or features not shown in FIG. 11(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 11(*a*).

As illustrated in the example of FIG. 11(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors, DSPs, field-programmable gate arrays, FPGAs, application-specific integrated circuits, ASICs, and processors based on a multi-core processor architecture, as examples. While a single processor 12 is shown in FIG. 11(*a*), multiple processors may be utilized according to other embodiments. For example, it should be understood that, in certain example embodiments, apparatus 10 may include two or more processors that may form a multiprocessor system, for example in this case processor 12 may represent a multiprocessor, that may support multiprocessing. According to certain example embodiments, the multiprocessor system may be tightly coupled or loosely coupled, for example to form a computer cluster.

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-9.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory, RAM, read only memory, ROM, static storage such as a magnetic or optical disk, hard disk drive, HDD, or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-9.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface, for example, a modem, coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform, IFFT, module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to receive configuration information of at least one periodic positioning sounding reference signal. According to certain example embodiments, the configuration information may include at least one time interval and at least one transmission resource associated with the at least one time interval. Apparatus 10 may also be controlled by memory 14 and processor 12 to transmit the at least one periodic positioning sounding reference signal to a network entity based on the configuration information. According to certain example embodiments, the at least one periodic positioning sounding reference signal may be in a first transmission status or a second transmission status in accordance to the at least one time interval. According to other example embodiments, the at least one time interval may occur periodically.

FIG. 11(*b*) illustrates an apparatus 20 according to certain example embodiments. In an example embodiment, the apparatus 20 may be a network element in a communications network or associated with such a network, such as a gNB, or other similar device. It should be noted that one of ordinary skill in the art would understand that apparatus 20 may include components or features not shown in FIG. 11(*b*).

As illustrated in the example of FIG. 11(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, DSPs, FPGAs, ASICs, and processors based on a multi-core processor architecture, as examples. While a single processor 22 is shown in FIG. 11(*b*), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-8 and 10.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of RAM, ROM, static storage such as a magnetic or optical disk, HDD, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-8 and 10.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, RFID, UWB, MulteFire, and the like. The radio interface may include components, such as filters, converters (for example, digital-to-analog converters and the like), mappers, a FFT module, and the like, to generate symbols for a transmission via one or more downlinks and to receive symbols, for example, via an uplink.

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations, for example analog and/or digital circuitry, combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a be a network element, a node, host, or server in a communication network or serving such a network. For example, apparatus 20 may be a C-SON, SON, or other similar device associated with a RAN, such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to determine at least one time interval for at least one periodic positioning sounding reference signal, during which the at least one periodic positioning sounding reference signal is in at least one of a first transmission status or a second transmission status. Apparatus 20 may also be controlled by memory 24 and processor 22 to transmit configuration information of the at least one periodic positioning sounding reference signal to at least one user equipment. According to certain example embodiments, the configuration information may include the at least one time interval and at least one transmission resource associated with the at least one time interval. According to other example embodiments, the at least one time interval may occur periodically.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Further example embodiments may provide means for performing any of the functions or procedures described herein. For example, certain example embodiments may be directed to an apparatus that includes means for receiving configuration information of at least one periodic positioning sounding reference signal. According to certain example embodiments, the configuration information may include at least one time interval and at least one transmission resource associated with the at least one time interval. The apparatus may also include means for transmitting the at least one periodic positioning sounding reference signal to a network entity based on the configuration information. According to certain example embodiments, the at least one periodic positioning sounding reference signal is in a first transmission status or a second transmission status in accordance to the at least one time interval. According to other example embodiments, the at least one time interval may occur periodically.

Other example embodiments may be directed to a further apparatus that includes means for determining at least one time interval for at least one periodic positioning sounding reference signal, during which the at least one periodic positioning sounding reference signal is in at least one of a first transmission status or a second transmission status. The apparatus may also include means for transmitting configuration information of the at least one periodic positioning sounding reference signal to at least one user equipment. According to certain example embodiments, the configuration information may include the at least one time interval and at least one transmission resource associated with the at least one time interval. According to other example embodiments, the at least one time interval may occur periodically.

Certain example embodiments described herein provide several technical improvements, enhancements, and/or advantages. In some example embodiments, it may be possible to ensure that RAN can provide sufficient measurements for positioning to the LMF with low latency without wasting power and resource(s) of the UE for Pos-SRS transmission, while minimizing signaling overhead and potential interference. Certain example embodiments may also reduce signaling exchange for triggering PRS/SRS dynamically, which may save signaling overhead. In other example embodiments, it may be possible to ensure appropriate parameters are used whenever a positioning request is made by the LMF, while avoiding wasting energy and resource(s) when measurements at the network side is actually not required.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit, ASIC, a programmable gate array, PGA, a field programmable gate array, FPGA, or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation, 4G, technology.

Partial Glossary

3GPP 3$^{rd}$ Generation Partnership Project
4G 4$^{th}$ Generation Wireless Technology
5G 5$^{th}$ Generation Wireless Technology
DL Downlink
eNB Enhanced Node B
gNB 5G or NR Base Station
IIoT Industrial Internet of Things
LCS Location Service
LMF Location Management Function
LPP LTE Positioning Protocol
LTE Long Term Evolution
NR New Radio
NRPPa New Radio Positioning Protocol Annex
PRS Positioning Reference Signal
QoS Quality of Service
RRC Radio Resource Control
SgNB Serving gNB
SIB Signal Information Block
SL Sidelink
SRS Sounding Reference Signal
TRP Transmission Reception Point
UE User Equipment
UL Uplink
UL-TDoA Uplink Time Difference of Arrival
UL-AoA Uplink Angle of Arrival

We claim:

1. A method, comprising:

receiving, at a user equipment, configuration information of at least one periodic positioning sounding reference signal, wherein the configuration information comprises at least one time interval and at least one transmission resource associated with the at least one time interval; and transmitting the at least one periodic positioning sounding reference signal to a network entity based on the configuration information, wherein the at least one periodic positioning sounding reference signal is in a first transmission status or a second transmission status in accordance with the at least one time interval, and wherein the at least one time interval occurs periodically, wherein the at least one periodic positioning sounding reference signal is associated to at least one bitmap, and wherein the bitmap indicates a specific time unit in the first transmission status or the second transmission status of the at least one periodic positioning sounding reference signal within a cycle.

2. The method according to claim 1, wherein the first transmission status corresponds to a first set of parameters associated with the at least one periodic positioning sounding reference signal, and wherein the second transmission status corresponds to a second set of parameters associated with the at least one periodic positioning sounding reference signal.

3. The method according to claim 2, wherein the first set of parameters comprises a first comb structure of the at least one periodic positioning sounding reference signal, and wherein the second set of parameters comprises a second comb structure different from the first comb structure of the at least one periodic positioning sounding reference signal.

4. The method according to claim 1 wherein the first transmission status corresponds to transmitting the at least one periodic positioning sounding reference signal, and wherein the second transmission status corresponds to muting the transmission of the at least one periodic sounding reference signal.

5. The method according to claim 1, wherein a periodicity for transmitting the at least one periodic sounding reference signal in the first transmission status is different from a periodicity for transmitting the at least one periodic sounding reference signal in the second transmission status.

6. The method according to claim 1, wherein the at least one periodic positioning sounding reference signal is associated to a plurality of bitmaps, wherein each of the plurality of bitmaps indicates a specific time unit in the first transmission status or the second transmission status of the at least one periodic positioning sounding reference signal within a cycle, and wherein each of the plurality of bitmaps is mapped to a specific beam or beam set configuration.

7. An apparatus, comprising:

at least one processor; and at least one memory comprising computer program code, the at least one memory and the computer program code are configured, with the at least one processor to cause the apparatus at least to receive configuration information of at least one periodic positioning sounding reference signal, wherein the configuration information comprises at least one time interval and at least one transmission resource associated with the at least one time interval; and transmit the at least one periodic positioning sounding reference signal to a network entity based on the configuration information, wherein the at least one periodic positioning sounding reference signal is in a first transmission status or a second transmission status in accordance with the at least one time interval, and wherein the at least one time interval occurs periodically, wherein the at least one periodic positioning sounding reference signal is associated to at least one bitmap, and wherein the bitmap indicates a specific time unit in the first transmission status or the second transmission status of the at least one periodic positioning sounding reference signal within a cycle.

8. The apparatus according to claim 7, wherein the first transmission status corresponds to a first set of parameters associated with the at least one periodic positioning sounding reference signal, and wherein the second transmission status corresponds to a second set of parameters associated with the at least one periodic positioning sounding reference signal.

9. The apparatus according to claim 8, wherein the first set of parameters comprises a first comb structure of the at least one periodic positioning sounding reference signal, and wherein the second set of parameters comprises a second comb structure different from the first comb structure of the at least one periodic positioning sounding reference signal.

10. The apparatus according to claim 7, wherein the first transmission status corresponds to transmitting the at least one periodic positioning sounding reference signal, and wherein the second transmission status corresponds to muting the transmission of the at least one periodic sounding reference signal.

11. The apparatus according to claim 7, wherein a periodicity for transmitting the at least one periodic sounding reference signal in the first transmission status is different from a periodicity for transmitting the at least one periodic sounding reference signal in the second transmission status.

12. The apparatus according to claim 7, wherein the at least one periodic positioning sounding reference signal is associated to a plurality of bitmaps, wherein each of the plurality of bitmaps indicates a specific time unit in the first transmission status or the second transmission status of the at least one periodic positioning sounding reference signal within a cycle, and wherein each of the plurality of bitmaps is mapped to a specific beam or beam set configuration.

13. A non-transitory computer readable medium comprising program instructions stored thereon to cause an apparatus for performing:

receiving configuration information of at least one periodic positioning sounding reference signal, wherein the configuration information comprises at least one time interval and at least one transmission resource associated with the at least one time interval; and transmitting the at least one periodic positioning sounding reference signal to a network entity based on the configuration information, wherein the at least one periodic positioning sounding reference signal is in a first transmission status or a second transmission status in accordance with the at least one time interval, and wherein the at least one time interval occurs periodically, wherein the at least one periodic positioning sounding reference signal is associated to at least one bitmap, and wherein the bitmap indicates a specific time unit in the first transmission status or the second transmission status of the at least one periodic positioning sounding reference signal within a cycle.

14. The non-transitory computer readable medium according to claim 13, wherein the first transmission status corresponds to a first set of parameters associated with the at least one periodic positioning sounding reference signal, and wherein the second transmission status corresponds to a second set of parameters associated with the at least one periodic positioning sounding reference signal.

15. The non-transitory computer readable medium according to claim 14, wherein the first set of parameters comprises a first comb structure of the at least one periodic positioning sounding reference signal, and wherein the second set of parameters comprises a second comb structure different from the first comb structure of the at least one periodic positioning sounding reference signal.

16. The non-transitory computer readable medium according to claim 13, wherein the first transmission status corresponds to transmitting the at least one periodic positioning sounding reference signal, and wherein the second transmission status corresponds to muting the transmission of the at least one periodic sounding reference signal.

17. The non-transitory computer readable medium according to claim 13, wherein a periodicity for transmitting the at least one periodic sounding reference signal in the first transmission status is different from a periodicity for transmitting the at least one periodic sounding reference signal in the second transmission status.

* * * * *